United States Patent Office.

C. H. PROESSDORF AND E. BAUCH, OF BOSTON HIGHLAND, MASSACHUSETTS.

Letters Patent No. 93,476, dated August 10, 1869.

IMPROVED WOVEN HOSE FOR WATER, &c.

The Schedule referred to in these Letters Patent and making part of the same.

*To all whom it may concern:*

Be it known that we, C. H. PROESSDORF and E. BAUCH, of Boston Highland, in the county of Suffolk, and State of Massachusetts, have invented a new and improved Water-Tight Hose; and we do hereby declare that the following is a full, clear, and exact description thereof, which will enable others skilled in the art to make and use the same.

The invention relates to a new compound for making woven hose or piping water-tight, so that it may be used to the same advantage as rubber and leather hose.

It is well known that woven hose can be made much stronger and more durable than that made of rubber or leather, the only drawback being that it is not water-tight. By our invention, a hose will, therefore, be produced which is as tight and reliable, but much stronger than the other.

Our invention consists in the employment of a compound which is made of about four parts of linseed-oil, three parts of beeswax, and one part of pitch.

Neither one of these ingredients alone would answer, as the oil alone does not make the fabric water-tight, while the beeswax does not adhere, and pitch alone is too brittle. These compounds are boiled together, and applied either to the inner side of the hose directly, or preferably to a separate fabric, which is then made to adhere to the inner side of the hose.

The mixture will always remain pliable, and will, therefore, leave the hose elastic.

Having thus described our invention,

We claim as new, and desire to secure by Letters Patent—

As an improved article of manufacture, woven hose or water-pipe, made water-tight by the compound herein set forth.

C. H. PROESSDORF.
E. BAUCH.

Witnesses:
L. SCHULER SCHÜTZ,
CHARLES HAUSE.